United States Patent [19]

Cray, Jr.

[11] 4,128,880

[45] Dec. 5, 1978

[54] COMPUTER VECTOR REGISTER PROCESSING

[75] Inventor: Seymour R. Cray, Jr., Lilydale, Minn.

[73] Assignee: Cray Research, Inc., Chippewa Falls, Wis.

[21] Appl. No.: 701,119

[22] Filed: Jun. 30, 1976

[51] Int. Cl.² .................................................. G06F 9/18
[52] U.S. Cl. .................................................... 364/200
[58] Field of Search ..................................... 340/172.5; 364/200 MS File, 900 MS File

[56] References Cited

U.S. PATENT DOCUMENTS

| | | | |
|---|---|---|---|
| 3,462,744 | 8/1969 | Tomasulo et al. | 340/172.5 |
| 3,573,851 | 4/1971 | Watson et al. | 340/172.5 |
| 3,787,673 | 1/1974 | Watson et al. | 340/172.5 |
| 3,815,095 | 6/1974 | Wester | 340/172.5 |
| 3,875,391 | 4/1975 | Shapiro et al. | 340/172.5 X |

Primary Examiner—Mark E. Nusbaum
Attorney, Agent, or Firm—Merchant, Gould, Smith, Edell, Welter & Schmidt

[57] ABSTRACT

Vector processing in a computer is achieved by means of a plurality of vector registers, a plurality of independent fully segmented functional units, and means for controlling the operation of the vector registers. Operations are performed on data from vector register to functional unit and back to vector register with minimal delay, rather than memory to functional unit and return to memory with its attendant much greater start-up delays. Data may be bulk transferred between memory and some vector registers while other vector registers are involved in vector processing with one or more functional units. In vector processing elements of one or more vector registers are successively transmitted as operands to a functional unit at a rate of one per clock period, and results are transmitted from a functional unit to a receiving vector register at the same rate. In a chaining mode of operation, the elements in a result vector register become available for immediate and simultaneous transmission as operands to another functional unit. In this mode, more than one result can be obtained per clock period.

12 Claims, 13 Drawing Figures

NEW $(V2_{00})$ $(V2_{08}) = (V2_{00}) + (V1_{08}) = \overbrace{(V2_{00}) + (V1_{00})} + (V1_{08})$
$(V2_{09}) = (V2_{01}) + (V1_{09}) = (V2_{00}) + (V1_{01}) + (V1_{09})$
$(V2_{10}) = (V2_{02}) + (V1_{10}) = (V2_{00}) + (V1_{02}) + (V1_{10})$
$(V2_{11}) = (V2_{03}) + (V1_{11}) = (V2_{00}) + (V1_{03}) + (V1_{11})$
$(V2_{12}) = (V2_{04}) + (V1_{12}) = (V2_{00}) + (V1_{04}) + (V1_{12})$
$(V2_{13}) = (V2_{05}) + (V1_{13}) = (V2_{00}) + (V1_{05}) + (V1_{13})$
$(V2_{14}) = (V2_{06}) + (V1_{14}) = (V2_{00}) + (V1_{06}) + (V1_{14})$
$(V2_{15}) = (V2_{07}) + (V1_{15}) = (V2_{00}) + (V1_{07}) + (V1_{15})$
$(V2_{16}) = (V2_{08}) + (V1_{16}) = (V2_{00}) + (V1_{00}) + (V1_{08}) + (V1_{16})$ $\vdots$ $(V2_{56}) = (V2_{48}) + (V1_{56}) = (V2_{00}) + (V1_{00}) + (V1_{08}) + (V1_{16}) \ldots + (V1_{56})$
$(V2_{57}) = (V2_{49}) + (V1_{57}) = (V2_{00}) + (V1_{01}) + (V1_{09}) + (V1_{17}) \ldots + (V1_{57})$
$(V2_{58}) = (V2_{50}) + (V1_{58}) = (V2_{00}) + (V1_{02}) + (V1_{10}) + (V1_{18}) \ldots + (V1_{58})$
$(V2_{59}) = (V2_{51}) + (V1_{59}) = (V2_{00}) + (V1_{03}) + (V1_{11}) + (V1_{19}) \ldots + (V1_{59})$
$(V2_{60}) = (V2_{52}) + (V1_{60}) = (V2_{00}) + (V1_{04}) + (V1_{12}) + (V1_{20}) \ldots + (V1_{60})$
$(V2_{61}) = (V2_{53}) + (V1_{61}) = (V2_{00}) + (V1_{05}) + (V1_{13}) + (V1_{21}) \ldots + (V1_{61})$
$(V2_{62}) = (V2_{54}) + (V1_{62}) = (V2_{00}) + (V1_{06}) + (V1_{14}) + (V1_{22}) \ldots + (V1_{62})$
$(V2_{63}) = (V2_{55}) + (V1_{63}) = (V2_{00}) + (V1_{07}) + (V1_{15}) + (V1_{23}) \ldots + (V1_{63})$

COMPUTER VECTOR REGISTER PROCESSING

BACKGROUND OF THE INVENTION

The present invention pertains to the field of high speed digital data processors, and more particularly to computing machines adapted for vector processing.

Most prior art computers are organized with an arithmetic unit which can communicate with a memory and with input-output (I/O). To perform a given arithmetic function, each of the operands must be successively brought to the arithmetic unit from memory, the function must be performed, and the result must be returned to the memory. This process typically takes a great deal of time, since a number of clock periods are required for transmission between memory and the arithmetic unit, plus several clock periods for performing the operation. Machines operating with this type of organization are called scalar machines.

There are many circumstances in problem solving with computers where it is necessary to perform the same operation repetitively on each successive element of a set of data. In scalar machines, in order to perform this type of repetitive operation, it is necessary to operate by software program and indexing so as to successively bring each operand to the arithmetic unit and to return the result to memory. This type of task is very time consuming because of the delays associated with the memory-arithmetic unit transfers for each operation on the individual elements of the ordered set.

In order to provide more rapid processing when dealing with ordered arrays of data, vector machines have been developed. As used in the data processing field, the term vector refers to an ordered set or array of data. An illustrative vector operation performed by a vector machine would be the adding of two operand vectors to perform a result vector. Each element of the result vector in this example would be the sum of the correpondingly ordered operands of the operand vectors. Basically, a vector machine is one which deals with these ordered sets of data by virtue of its hardware organization, rather than by a software program and indexing, thus attaining a higher speed of operation.

One prior art vector machine is known as the Illiac, which attempts to provide full parallel operation on arrays of data. A network of 256 arithmetic unit processors are provided, and entire vectors up to 256 elements long are transmitted in parallel to the arithmetic unit processors. Results are transmitted in parallel back to memory. One obvious problem with this parallel approach to vector processing is the extremely high cost of providing a great number of independent arithmetic unit processors. Another problem is the inherent reliability problems with synchronizing all elements of such a large network.

Another type of vector machine makes use of four programmable arithmetic units, each having high speed paths termed "pipes" to bring operands to the arithmetic unit and to return results to memory. In operation, the vector is read through the pipes under hardware control to supply a stream of data to an arithmetic unit. One type of streaming machine employing pipes has been developed by Texas Instruments.

Another type of streaming system is represented by the Control Data Corporation Star machine. In this machine, one large stream of data, called a "sword" is provided to an arithmetic unit, rather than four smaller streams for pipes.

All streaming types of vector machines operate memory-to-memory. As such, they all suffer from the start-up time lag which is inherent in the memory to arithmetic unit path. It may take from 10 to 100 clock periods from initial instruction before the first pair of operands begin to arrive through the pipe or sword to the arithmetic unit. In other words, it takes a considerable period of time to fill the pipe with the stream of data. However once the pipe is filled and the data begins arriving, streaming type vector machines will give successive answers at a high rate of speed, much faster than scalar machines. Streaming type vector machines are thus put to their most efficient use when operating on very long vectors containing a great number of individual elements.

The length of vectors associated with the solution of a given problem is of course determined by the nature of the problem. Vector lengths can vary from two elements on up, with no theoretic upper limit. From actual experience in working with vector processing, it has been found that the most usually encountered vector problems involve rather short vectors of approximately 5 to 10 elements. With short vectors, it is generally not worth the start-up time required to operate in vector processing mode on prior art streaming type vector machines. As a result, the short vectors routinely encountered in numerous scientific calculations are generally still performed in the time inefficient scalar mode.

The present invention provides a vector processing machine which is uniquely adapted for efficient processing of short and moderate length vectors. Longer vectors can also be accommodated by processing in groups under program control.

SUMMARY OF THE INVENTION

The present invention provides vector processing apparatus for a computer. A plurality of vector registers are provided, each of which is adapted for holding a plurality of elements of an ordered set of data. At least one segmented functional unit, and in the preferred embodiment, a plurality of independent segmented functional units are provided. Each functional unit has an input for receiving operands and an output for delivering results computed or processed by the functional unit. Means are provided for successively transmitting the elements of one or more of the vector registers as operands to the input of a functional unit, and for successively transmitting results from the output of the functional unit to the elements of one of the vector registers.

As soon as results begin to be received in the result vector register, they may become available through a mode of operation known as chaining, for being simultaneously supplied as operands to another functional unit. In the chaining mode, more than one result can be obtained per clock period.

BRIEF DESCRIPTION OF THE DRAWINGS

In the drawing,

FIG. 9 is a table illustrating recursive operation of a vector register according to the present invention.

DETAILED DESCRIPTION OF THE PREFERRED EMBODIMENT

The configuration and operation of the vector processing and control means according to the present invention can best be understood by beginning with a general description of the organization of a computer system employing the present invention. Details of the configuration and operation of the vector processing will then be presented.

Figure 1:
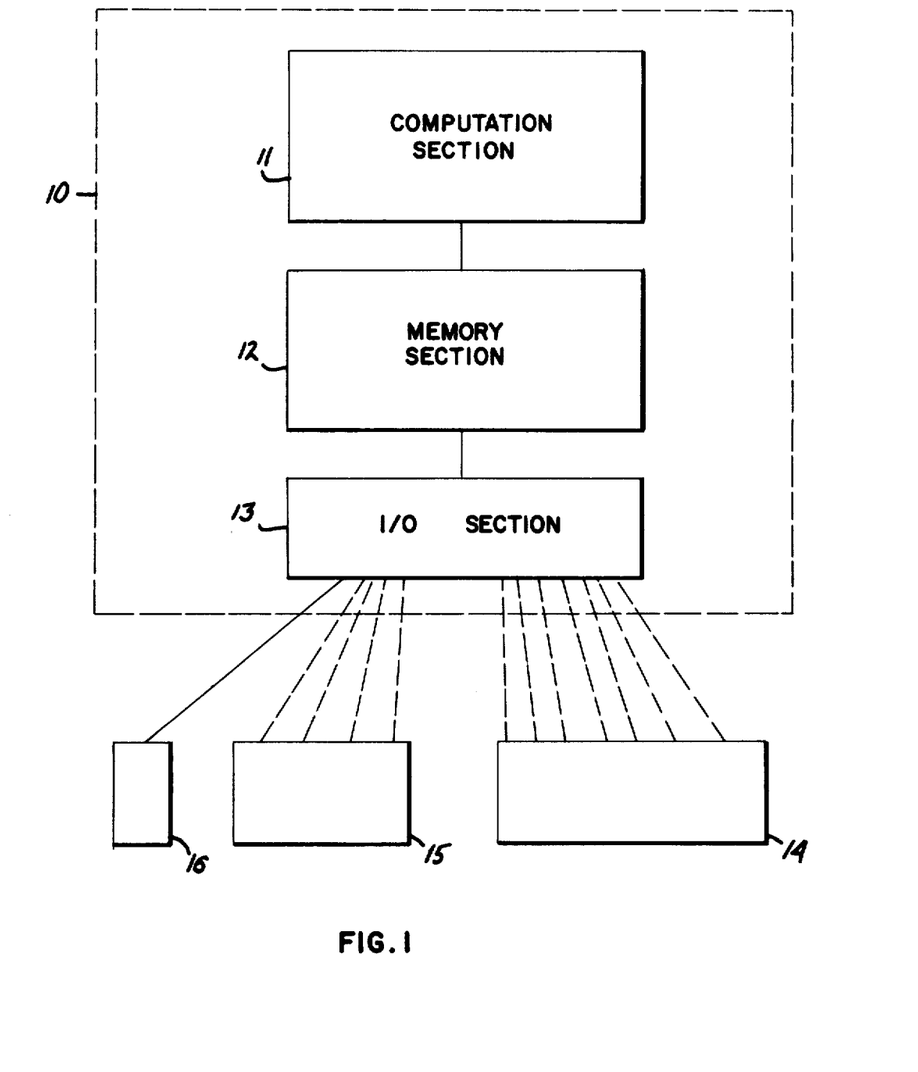
FIG. 1 is a block diagram of a computer system which may incorporate the present invention.

In the block diagram of FIG. 1, reference number 10 generally designates the central processor unit. Central processor 10 includes a computation section 11, a memory section 12, and an I/O section 13. Computation section 11 includes functional units, registers including vector registers, instruction buffers and control hardware for operating in either scalar or vector mode. Computation section 11 interfaces with memory section 12, and the memory section also interfaces with I/O section 13. Because of the extremely high data rate demands made by the computation section, especially when operating in vector mode, it is important that the memory section be large and fast if the full potential of the vector processing of the present invention is to be utilized. In a computer system built according to the preferred embodiment of the present invention, bipolar LSI memory chips are used, and one-quarter million to one million words of memory are provided.

The I/O section preferably contains 12 full duplex I/O channels which connect to I/O stations and peripheral equipment indicated by reference number 14 and to mass storage subsystems 15 which may include disc units. A maintenance control unit 16 may be connected through one of the I/O channels. The I/O channels are scanned sequentially for I/O requests which may be serviced on a priority basis.

Figure 2:
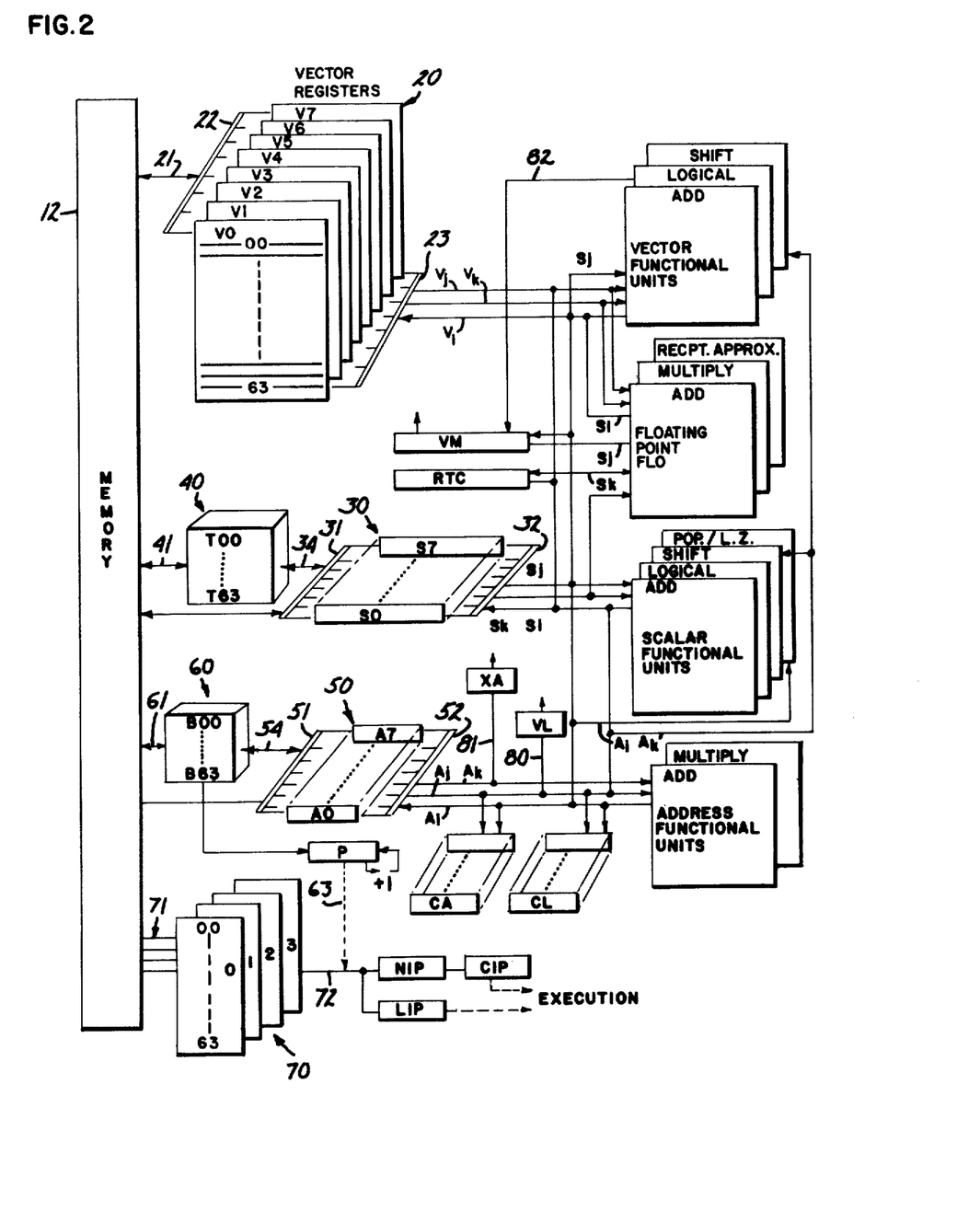
FIG. 2 is a more detailed block diagram of the computation section of a computer incorporating the present invention.

FIG. 2 shows the computation section of the computer system of FIG. 1 in greater detail. Memory 12 is also shown in block diagram form. The computation section includes a set of vector registers generally designated by reference number 20. The vector registers form the major computational registers of the computer, since they provide for the high speed vector processing of data. In the preferred embodiment there are eight individual vector registers, designated V0 through V7. Each register has 64 individual elements, as indicated by the designation of elements 00 through 63 on vector register V0. Each element can hold a 64 bit word.

The specific numbers used herein for word length, number of registers, length of vector registers and the like relate to the presently preferred embodiment. It will be understood that the principles according to the present invention as set forth herein are equally applicable to other configurations of machines using a different number of vector registers, vector lengths, or a different word size.

A data path or trunk 21 is provided for data transfers between the vector registers and memory 12. Data path 21 connects to a signal path select, or fan-out 22 for communicating with individual vector registers. Another fan-out 23 is indicated for communicating from any of the vector registers to the functional units.

In the computer organization of FIG. 2, there are three functional units dedicated to vector processing. These are the add unit, the logical unit and the shift unit. Three additional functional units are shared between the vector and scalar portions of the machine. These are the floating point functional units for addition, multiplication and reciprocal approximation.

There are four scalar functional units: the addition, logical, shift, and population/leading zero functional units. Two functional units are associated with address functions: the add and multiply address functional units. Together the vector, floating point, scalar, and address functional units comprise the arithmetic unit of the machine. The vector and floating point functional units are each fully segmented for vector operation, as explained more fully hereinafter.

Scalar registers are provided as indicated by reference number 30. In the preferred embodiment eight scalar registers numbers S0 through S7 are used. A plurality of T registers 40 are provided to support scalar operations. In the preferred embodiment 64 T registers numbered T00 through T63 are employed. These T registers communicate with memory by a data path 41. Fan-outs 31 and 32 are provided for communicating with individual S registers. A data trunk 33 leads directly between fan-out 31 and memory 12. Another data path 34 communicates between the T registers and the fan-out for the scalar registers.

A plurality of address registers 50 are provided. In the preferred embodiment eight such registers A0 through A7 are used. Fan-outs 51 and 52 are used for communication with individual address registers. A plurality of B registers 60 are provided to support address operations. The preferred embodiment uses 64 such registers, numbered B00 through B63. A data path 61 provides two-way communication betwen memory 12 and the B registers. A data path 54 provides communication from the B registers to fan-out 51 for the A registers, and a data path 53 interconnects memory 12 and the A registers.

Instruction buffers 70 are provided as part of the instruction issue and control portions of the computer. In the preferred embodiment four instruction buffers are utilized, numbered 0 through 3. Each instruction buffer can contain 64 instruction parcels, numbered 00 through 63 as indicated with respect to instruction buffer 0. Instructions from the instruction buffers are fed via an instruction line 72 to a pair of control registers NIP, which stands for next instruction parcel and LIP which stands for lower instruction parcel. Instructions from NIP may be passed to the current instruction parcel register (CIP). Instructions may then be issued for execution as explained more fully hereinafter.

The P register is part of the instruction issue and control portions of the computer. It connects via lines 62 and 63 to the B registers and to the instruction path 72.

A set of channel address registers (CA) and the set of channel limit registers (CL) are provided for each channel of I/O. The CA register contains the address of the next channel word and the CL register specifies the limit address. In programming a channel, the CL register is first initialized with the channel limit address and then the channel is activated by setting the beginning address in CA. During transfer, the contents of CA is incremented towards the contents of CL. When the channel address equals the channel limit, the I/O transfer is complete and interrupt occurs.

A vector length register VL is provided, which may receive an input on a data line 80 from the A registers. XA refers to an exchange control register which is connected by a data line 81 to the A registers. VM is the vector mask register, and RTC is the real time clock.

The data and instruction paths or trunks among the various registers and functional units will now be described. The paths are indicated in the block diagram of FIG. 2 by means of letters V for vector, S for scalar, and A for address. In addition, subscripts $i$, $j$ and $k$ are used. Subscripts j and k are used for registers or data paths supplying operands, and subscript i is used for registers or data paths receiving results.

Data paths $V_j$ and $V_k$ run from vector register fanout 23 to the vector functional units and the floating point functional units. Data path $V_i$ runs from the vector functional units and the floating point functional units to vector register fan-out 23.

In similar manner data paths $S_j$ and $S_k$ run from scalar register fan-out 32 to the scalar functional units and the floating point functional units. Data path $S_i$ returns from the floating point functional units and the scalar functional units to fan-out 32. Additionally, $S_j$ data path connects to the real time clock, the vector mask register, and to the vector functional units. A data path 82 connects from the logical unit of the vector functional units to the vector mask register.

Data paths $A_j$ and $A_k$ run from fan-out 52 of the address registers to the address functional units. In addition, the $A_k$ path provides address operands to the shift scalar functional unit and the shift vector functional unit. Data path $A_k$ also runs to the channel address and channel limit registers. $A_i$ data path runs from the address functional units, the CA and CL registers, and from the population/leading zero scalar functional unit to fan-out 52 of the address registers.

The purpose of each of the registers and functional units in FIG. 2 will now be briefly explained. As previously mentioned, the V registers are the major computational registers of the computer of FIG. 2. Each register has 64 elements. When associated data is grouped into successive elements of a V register, the register quantity may be considered a vector. Examples of vector quantities are rows or columns of a matrix or elements of a table. Computational efficiency is achieved by processing each element of a vector identically. Vector instructions provide for the iterrative processing of successive V register elements. For a given vector operation, one or more V registers are designated for providing operands ($V_j$ and $V_k$ registers), and another V register is designated to receive the results ($V_i$ register). A vector operation begins by obtaining operands from the first element of one or more V registers and delivering the results to the first element of the $V_i$ register. Successive elements are provided in each clock period, and as each operation is performed the result is delivered to successive elements of the result V register ($V_i$). The vector operation continues until the number of operations performed by the instruction equals a count specified by the contents of the vector length (VL) register. Vectors having lengths exceeding 64 are handled under program control in groups of 64 and a remainder.

A result may be received by a V register and retransmitted as an operand to a subsequent operation in the same clock period. The use of a register as both a result and operand register allows for the "chaining" of two or more vector operations together. In this mode, two or more results may be produced per clock period.

The contents of a V register are transferred to or from memory over data path 21 in a block mode by specifying a first word address in memory, an increment for the memory address, and a vector length. The transfer then proceeds beginning with the first element of the V register at a maximum rate of one word per clock period, depending upon memory bank conflicts.

In order to achieve high block transfer rates to and from memory, the memory 12 is preferably organized in four phased banks. By placing successive words in successive banks in rotating fashion, data can be transferred at a rate four times the random access time for a single memory bank.

Single word data transfers may be performed over the data path network between an S register and an element of a V register.

The vector length register (VL) can be set by transmitting a value to and from an A register. The VL register specifies the length of all vector operations performed by vector instructions, and the corresponding length of the vectors held by the V registers.

The vector mask register (VM) has 64 bits, each of which corresponds to a word element in a vector register. Bit 0 corresponds to element 0, and bit 63 to element 63. The mask is used in conjunction with vector merge and test instructions to allow operations to be performed on individual vector elements. The vector mask register may be set from an S register, or the vector mask contents may be generated by testing a vector register for a condition by the logical vector functional unit.

The mask controls element selection in a vector merge instruction. In one type of vector merge operation, the first operand is a scalar constant from register $S_j$, and the second operand is a successive element from a $V_k$ register. In the other type of vector merge operation, the first operand is a successive element from a $V_j$ register, and the second operand is a successive element from a $V_k$ register. In either type of vector merge operation, the vector mask controls which of the operands will be transmitted to the $V_i$ result register. If bit $n$ of the vector mask is one, the first of the nth ordered operands is transmitted; if bit $n$ of the mask is 0, the second of the nth ordered operands (the nth $V_k$ element) is selected and transmitted to the nth element of the $V_i$ register.

The eight 64 bit S registers are the principle scalar registers for the central processing unit. These registers serve as the source and destination for operands and results in the execution of scalar arithmetic and logical instructions. The related functional units perform both integer and floating point arithmetic operations. As will be explained more fully hereinafter, S registers may furnish one operand in a vector process.

Data can move directly between memory and S registers on data path 33, or it can be placed in T registers as an intermediate step. This allows buffering of scalar operands between S registers and memory. Data can also be transferred between A and S registers.

Another use of the S registers is for setting or reading the vector mask (VM) register or the real time clock register (RTC).

The T registers are used as intermediate storage for the S registers. Data may be transferred between T and S registers on data path 34, and between T registers and memory on data path 41.

The A registers serve a variety of applications. They are primarily used as address registers for memory references and as index registers but also are used to provide values for shift counts, loop control, and channel I/O operations. In address applications, they are used to index the base address for scalar memory references and for providing both a base address and an index address for vector memory references.

The address functional units support address and index generation by performing integer arithmetic on operands obtained from A registers and delivering the results to A registers. Data can move directly between memory and A registers via data path 53, or can be placed in B registers for buffering between A registers and memory. Data can also be transferred between A and S registers. The vector length register VL is set by transmitting a value to it from an A register.

The B registers are used as intermediate storage for the A registers. Typically, the B registers will contain data to be referenced repeatedly over a sufficiently long span that it would not be desirable to retain the data in either A registers or in memory. Examples of uses are loop counts, variable array base addresses, and dimensions.

The functional units perform the mathematical and logical functions in the computer. Functional units receive operands from registers and deliver results to registers when the function has been performed. All functional units perform their algorithms in a fixed amount of time, depending upon the particular functional unit. The amount of time required from delivery of operands to the unit to the completion of the calculation is termed the functional unit time, and is measured in multiples of the clock period.

The functional units are all fully segmented. This means that a new set of operands for unrelated computation may enter a functional unit each clock period even though the functional unit time may be more than 1 clock period. This segmentation is made possible by capturing and holding the information arriving at the unit or moving within the unit at the end of every clock period.

The address functional units perform integer addition and subtraction, and integer multiplication for address operands.

The scalar add unit performs integer addition and subtraction on scalar operands, and delivers results to scalar result registers.

The scalar shift unit may be used to shift the entire 64 bit contents of an S register or to shift the double 128 bit contents of two concatenated S registers.

The scalar logical unit performs bit by bit manipulation of 64 bit quantities obtained from S registers.

The population/leading zero count unit counts the number of bits having a value of one in an operand, and counts the number of bits of zero preceding a one bit in the operand. Operands are obtained from an S register, and a result is delivered to an A register.

Most of the vector functional units perform operations on operands obtained from one or two V registers or from a V register and an S register. The reciprocal approximation unit, which requires only one operand, is an exception. Results from vector functional units are delivered to a V register.

Successive operand pairs are transmitted to a functional unit each clock period. A corresponding result emerges from the functional unit $n$ clock period later where $n$ is the functional unit time and is constant for a given functional unit.

A functional unit engaged in a vector operation remains busy during each clock period and may not participate in another operation. In this state, the functional unit is said to be reserved. Other instructions that require the same functional unit will not issue until the previous operation is complete. When the vector operation completes, the reservation is dropped and the functional unit is then available for another operation.

Similarly, the vector registers are reserved for a time period in which they are involved in a vector operation. Other instructions that require the same vector registers will not issue until the previous operation is complete. An exception to this latter rule is in the case of chaining of vector functions, which is explained more fully hereinafter. However, since all functional units are independent, multiple unrelated vector processing can be underway simultaneously using different functional units and different operand and result registers for each period.

The vector add unit performs integer addition and subtraction for a vector operation and delivers the results to the elements of a designated $V_i$ register. The vector shift unit shifts the entire 64 bit contents of a V register element or the 128 bit value formed from two consecutive elements of a V register. Shift counts are obtained from an A register. Shifts are end-off with zero fill.

The vector logical unit performs bit by bit manipulation of 64 bit quantities. The unit also performs the logical operations associated with the vector mask registrator, discussed previously.

The three floating point functional units perform floating point arithmetic for both scalar and vector operations. When executing a scalar instruction, operands are obtained from S registers and the results are delivered to an S register. When executing most vector instructions, operands are obtained from pairs of vector registers or from a V register and an S register and the results are delivered to a V register.

The floating point add unit performs addition or subtraction of 64 bit operands in floating point format. The floating point multiply unit provides multiplication of 64 bit operands in floating point format. The reciprocal approximation unit finds the approximate reciprocal of a 64 bit operand in floating point format.

The CIP register holds the instruction waiting to issue. If this instruction is a two parcel instruction, the CIP register holds the upper half of the instruction and the LIP holds the lower half. Once an instruction enters the CIP register it must issue. However, issue may be delayed until previous operations have been completed. Data arrives at the CIP register from the NIP register. The indicators which make up the instruction are distributed to all elements of the computer which have mode selection requirements when the instruction issues.

The NIP register holds a parcel of program code prior to entering the CIP register. If issue of the instruction in the CIP register is delayed, the data in the NIP register is held over for the next clock period.

The P register indicates the next parcel of program code to enter the NIP register in a linear program sequence. Instruction words contain four parcels of program code. The upper 20 bits of the P register indicate the word address for the program word in memory. The lower two bits indicate the parcel within the word. The content of the P register is normally advanced as each parcel successively enters the NIP register. The value in the P register normally corresponds to the parcel address for the parcel currently moving in the NIP register.

The four instruction buffers 70 each hold 64 consecutive 16 bit instruction parcels. These instruction parcels are held in the buffers prior to being delivered to the NIP or LIP registers.

The beginning instruction parcel in a buffer always has a parcel address that is an even multiple of $100_8$. This allows the entire range of addresses for instructions in a buffer to be defined by the high order 18 bits of the beginning parcel address. For each buffer, there is an 18 bit beginning address register which contains this value.

The beginning address registers are scanned each clock period. If the high order 18 bits of the P register match one of the beginning addresses, an in-buffer condition exists and the proper instruction parcel is selected from the instruction buffer. An instruction parcel to be executed is normally sent to the NIP register. However, the second half of a two parcel instruction is blocked from entering the NIP and is sent to the LIP, and is available when the upper half is used from the CIP register. An out-of-buffer condition exists when the high order 18 bits of the P register to not match any instruction buffer beginning address. When this condition occurs, instructions must be loaded into the instruction buffers from memory via data paths 71 before execution can continue.

The XA register is used in conjunction with an exchange mechanism for switching instruction execution from program to program. The XA register specifies the first word address of an exchange package which contains the necessary information for switching program execution.

The concept of vector register operation will now be generally described with the aid of FIG. 3. Vector instructions may be classified into four types. One type of vector instruction illustrated in FIG. 3A takes operands from a pair of vector registers and delivers results to another. In FIG. 3A, three vector registers are indicated, labeled $V_j$, $V_k$, and $V_i$. The curved figure labeled 90 is a symbolic representation of a data path through a functional unit. It is marked off in n clock periods, where n is the functional unit time for the given operation. As indicated by arrows 91 and 92, operands are successively read from the $V_j$ and $V_k$ registers and brought in pairs to the functional unit. Beginning n clock periods later, results are delivered at 93 into successive element of the $V_i$ register.

Figure 3A:
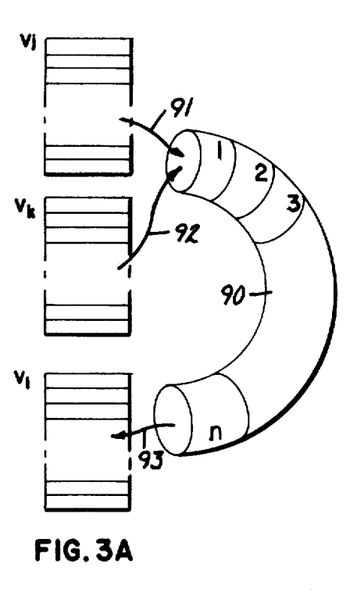
FIG. 3 is a graphical representation of the concept of vector register processing of the present invention.
Figure 3B:
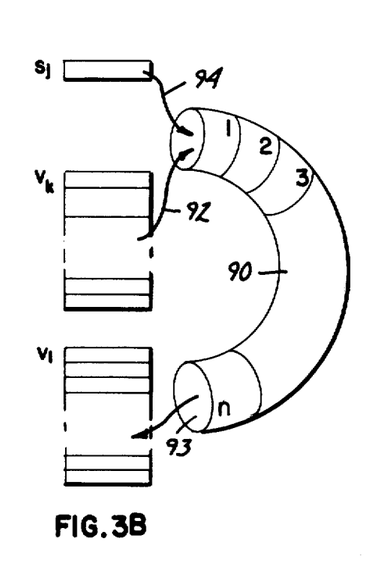

The second type of vector instruction is illustrated in FIG. 3B. In this type, one operand is obtained from an S register, and one from a V register. A copy of the contents of the designated $S_j$ register is delivered as indicated at 94 with each $V_k$ register operand. Results again are delivered to the $V_i$ register, beginning $n$ clock periods later.

Figure 3C:
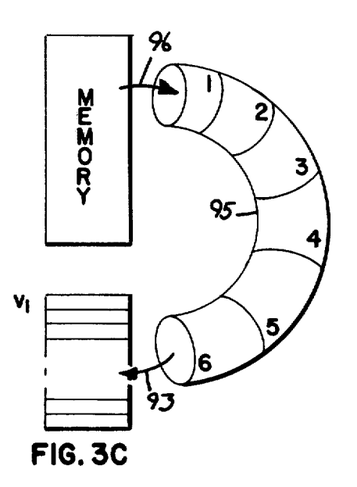
Figure 3D:
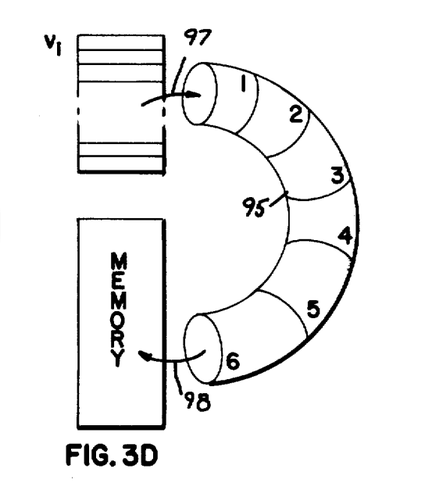

The other two types of vector instructions transmit data between memory and the V registers, as indicated in FIGS. 3C and 3D. A path between memory and the V registers may be considered a functional unit for timing considerations. In FIG. 3C, curved FIG. 95 is a symbolic representation of the data path from memory to a V register which is being loaded. Data begins entering the path from memory as indicated by arrow 96. Beginning six clock periods later, data is loaded into the successive elements of the $V_i$ register, one element per clock period. FIG. 3D illustrates the inverse operation, with the contents of a V register being transmitted one word per clock period to memory.

The important concept of vector operation and functional unit segmentation will now be explained with the aid of the timing diagram of FIG. 4. Let a particular element of a V register be specified by adding the element number as a subscript to the register name. For example, the first three elements of register V1 are $V1_0$, $V1_1$, and $V1_2$, respectively. Since a vector register has 64 elements, the last element of V1 is $V1_{63}$.

Figures 4, 6:
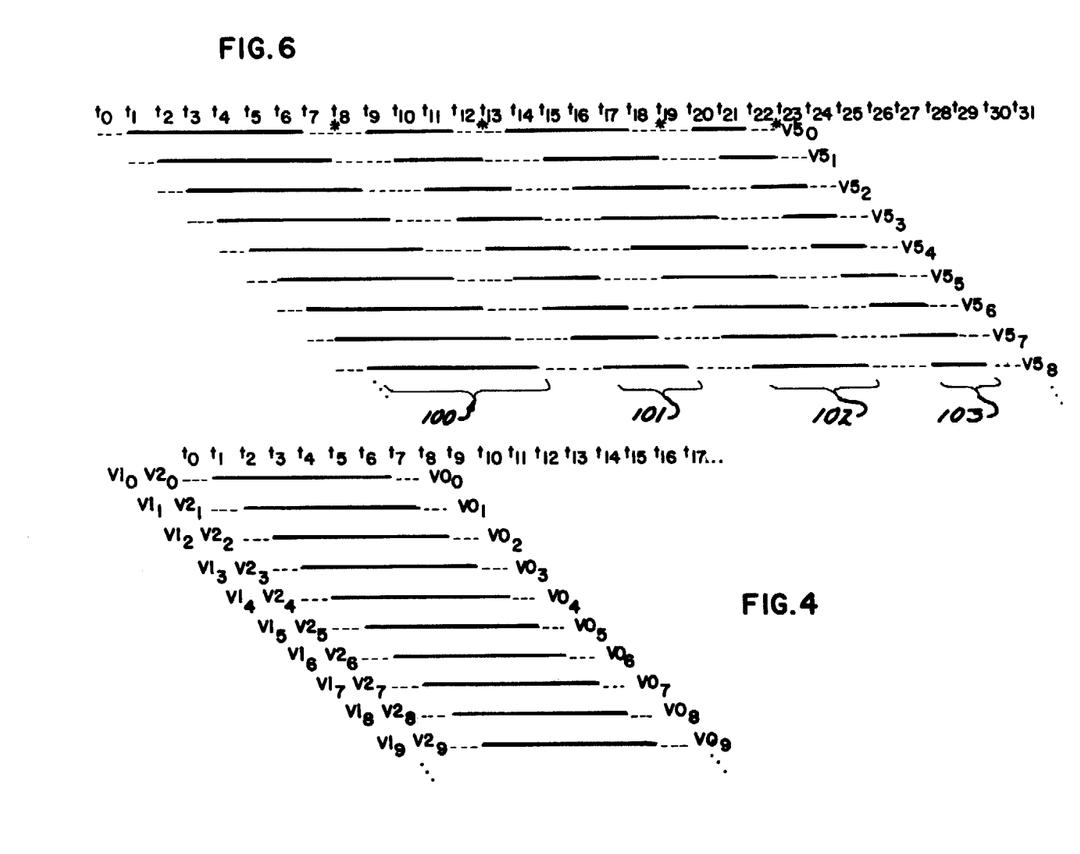
FIG. 4 is a timing diagram.
FIG. 6 is a timing diagram for the chaining example of FIG. 6.

The timing chart in FIG. 4 is for execution of a floating point addition instruction. This instruction is of the general type indicated in FIG. 3A since operands are obtained from two vector registers. In this example, V1 and V2 serve as the j and k operand registers, and $V_o$ is the $i$ or result register. When the instruction issues at clock period $t_0$, the first pair of elements $V1_0$ and $V2_0$ is transmitted to the add functional unit where it arrives at clock period $t_1$. The dashed lines indicate transit to and from the functional unit, and the bars or solid lines indicate time in the functional unit. The functional unit time for this unit is six clock periods, so the first result, which is the sum of $V1_0$ and $V2_0$ exits from the functional unit at clock period $t_7$. The sum is transmitted to the first element of result register V0 arriving at clock period $t_8$. Because the functional unit is fully segmented, the second pair of elements $V1_1$ and $V2_1$ is transmitted to the add functional unit at clock period $t_1$. At clock period $t_2$ the functional unit is in the process of performing two additions simultaneously, since the addition of $V1_0$ and $V2_0$ was begun in the previous clock period. The second result, which is the sum of $V1_1$ and $V2_1$, is entered into the second element of result register V0 at clock period $t_9$. Continuing in this manner, a new pair of elements enters the functional unit each clock period and the corresponding sum emerges from the unit six clock periods later and is transmitted to the result register. Since a new addition is begun each clock period, six additions may be in progress at one time. In general, the number of operations which can be performed simultaneously by a functional unit is equal to the functional unit time.

The vector length determines the total number of operations performed by a functional unit. Although each vector register has 64 elements, only the number of elements specified by the vector length register is processed by vector instruction.

As previously mentioned, when a vector instruction issues, the required functional unit and the operand registers are reserved for the number of clock periods determined by the vector length. A subsequent vector instruction which requires the same functional unit or operand register cannot issue until the reservations are released. When two vector instructions use different functional units and vector registers, they are independent and may issue in neighboring clock periods.

When a vector instruction issues, the result register is reserved for the number of clock periods determined by the vector length and functional unit time. This reservation allows the final operand pair to be processed by the functional unit time and the corresponding result to be transmitted to the result register.

A result register becomes the operand register for a succeeding instruction. In the process called "chaining," the succeeding instruction issues as soon as the first result arrives for use as an operand. This clock period is termed "chain slot time" and it occurs only once for each vector instruction. If the succeeding instruction cannot issue at chain slot time because of a prior functional unit or operand register reservation, then it must wait until the result register reservation is released.

Figure 5:
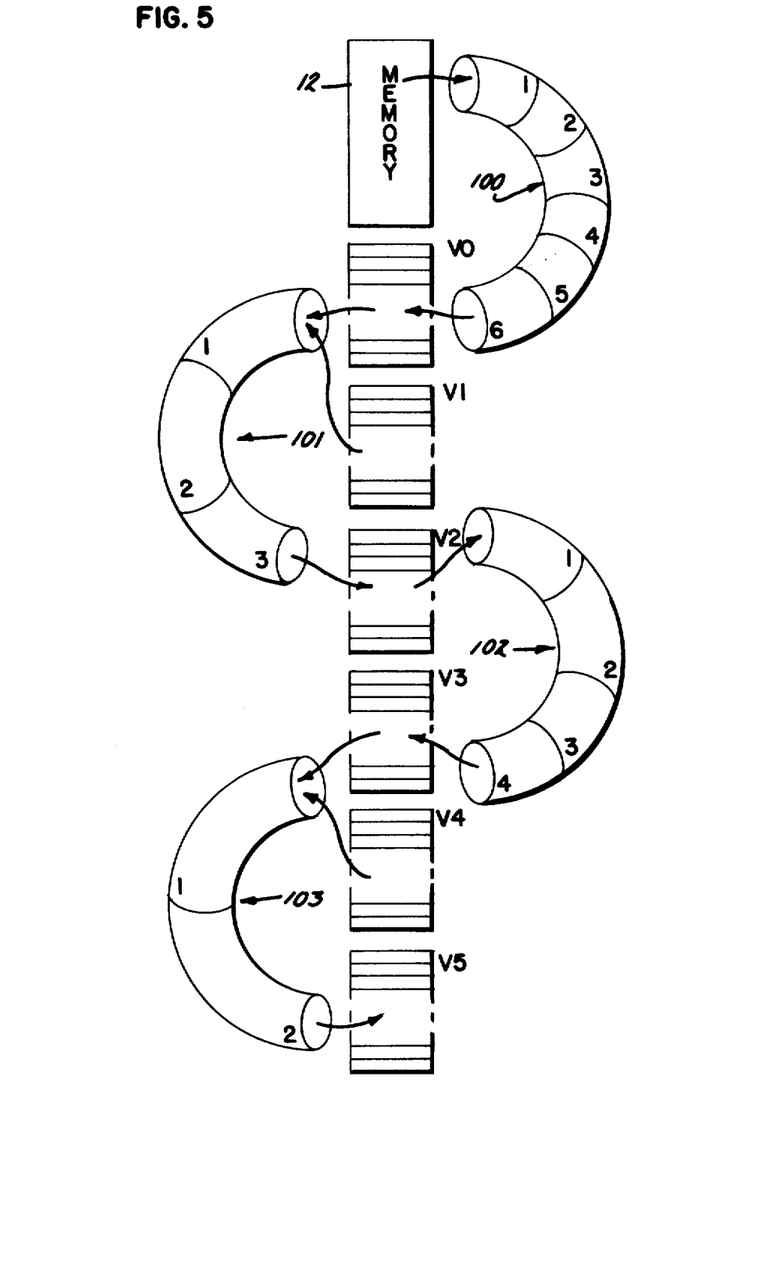
FIG. 5 is a graphical representation of the concept of vector register chaining according to the present invention.

FIG. 5 is a graphic illustration of the chaining of vector functions. Curved figure 100 indicates a memory read instruction wherein date from memory is loaded into vector register V0. Curved figure 101 indicates an integer add function, wherein operands from the V0 and V1 register are added and delivered to the V2 register. Curved figure 102 graphically represents a shift function wherein operands are received from the V2 register and delivered to the V3 register. Curved figure 103 indicates a logical product in which operands are taken from the V3 and V4 register, and the results are delivered to the V5 register.

FIG. 6, which is a timing diagram of the example of FIG. 5, will help clarify the concept of chaining. Gradations along the horizontal axis represent clock periods. The memory read instruction issues at clock period $t_0$. Each horizontal line shows the production of one element of the V5 result vector. Time spent in passing through each of the four functional units used in the instruction sequence is indicated by bars of corresponding length. Broken lines indicate passage of data to and from V registers, between functional units. Note that the production of a new element of V5 begins each clock period. Production of the first element of V5 begins at clock period $t_0$ with the reading of the first word from memory, production of the second element V5 begins at clock period $t_1$, with the reading of the second word from memory and so on. The first result enters V5 at clock period $t_{23}$ and a new result enters V5 each clock period thereafter. In the first horizontal line, which shows the production of the first element of V5 (V5$_0$), chain slot times for each functional unit are marked by asterisks.

The vector read instruction issues at clock period $t_0$. The first word arrives in element 0 of register V0 at clock period $t_8$, and is immediately transmitted along with element 0 of register V1, as an operand to the integer add functional unit. When the two operands arrive at the integer add functional unit at clock period $t_9$, the computation of the sum of V0$_0$ and V1$_0$ is begun. Three clock periods later at $t_{12}$ the sum is sent from the functional unit to element 0 of V2. It arrives at clock period $t_{13}$ and is immediately transmitted as an operand to the shift functional unit. At clock period $t_{14}$ the operand arrives at the shift functional unit and the shift operation is begun. The operation is completed four clock periods later at $t_{18}$ and the shifted sum is sent from the functional unit to element 0 of V3, arriving the next clock period. It is immediately transmitted, along with element 0 of V4, as an operand to the logical functional unit. When the two operands arrive at the logical functional unit at clock period $t_{20}$, the computation of the logical product of V3$_0$ and V4$_0$ is begun. Two clock periods later at $t_{22}$ the final result is sent from the functional unit to element 0 of V5 arriving at clock period $t_{23}$. While all this has been going on, production of the second element of V5 has been tracing the same path through the vector registers and functional units with a one clock period lag. Production of the third element of V5 lag is one more clock period behind, and so on. A new result arrives at the V5 result register each clock period.

Figure 7:
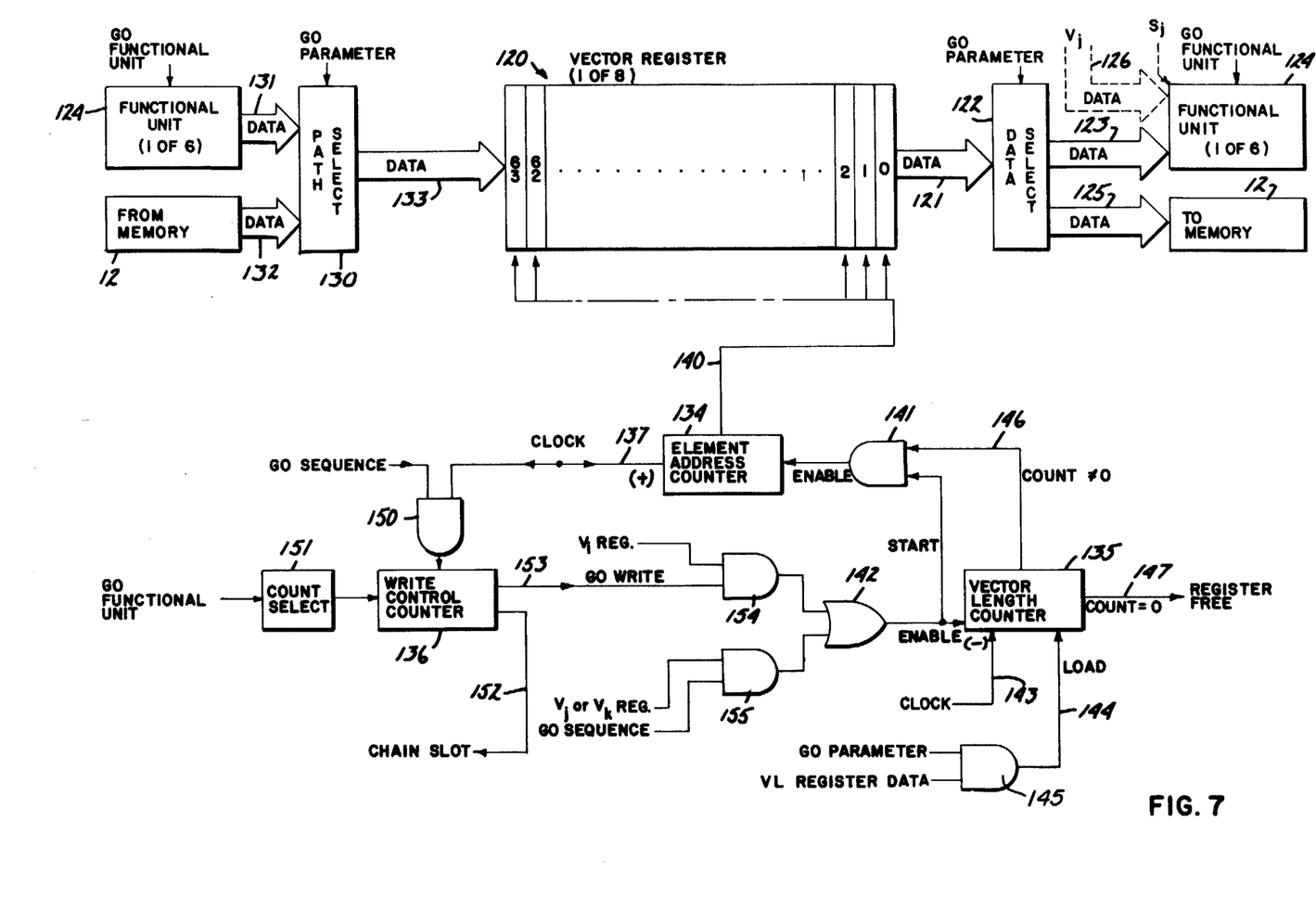
FIG. 7 is a schematic block diagram of a vector register and its control.

The vector register control and instruction issue will now be explained in greater detail with reference to FIGS. 7 and 8. In FIG. 7, a representative one of the eight registers is indicated by reference number 120. A data path 121 goes from the vector register to a path select network 122. Another data path runs from path select 122 to a functional unit, indicated by reference number 124. This functional unit could be any one of the six which are designed for vector processing, since each can be supplied from any V register. Another data path 125 runs from path select 122 to memory 12. Indicated in broken lines are a data path 126 which feeds data from another of the vector registers into a functional unit. Also indicated by broken line is a date path 127 which may deliver a copy of a scalar register to functional unit 124 with each operand during vector processing.

On the other side of the drawing is a functional unit also indicated by reference number 124 and the memory 12. These units deliver data to a path select 130 by means of data paths 131 and 132, respectively. Data from path select 130 is delivered via data path 133 to the vector register 120.

Vector processing control for vector register 120 of FIG. 7 is provided by element address counter 134, vector length counter 135, write control counter 136 and associated logic elements. Address counter 134 when enabled may be incremented by clock pulses applied thereto by lead 137. Address register 134 has possible count states 0 through 63, each one of which enables a given element of vector register 120 for a read or write operation. This function is indicated in FIG. 7 by control lead 140 which branches to each of the elements of register 120. Enable for address counter 134 is provided by an AND gate 141 which receives inputs from an OR gate 142 and from the vector length counter 135. Vector length counter 135 receives clock pulses on lead 143, and the vector length information on lead 144. This information is supplied from a gate 145 which receives go parameter and VL register data as its inputs. The output of OR gate 142 also supplies an enable signal to the vector length counter.

The go sequence signal supplies one input to a gate 150, the other input of which is supplied by the clock. The output of this gate goes to decrement write control counter 136. An initial count is loaded into write control counter 136 by count select unit 151, when the count select unit receives a go functional unit signal. This an other timing and control signals are explained further with reference to FIG. 8.

Write control counter 136 in turn supplies a chain slot signal on lead 152 and a go write signal on lead 153.

The go write signal and a $V_i$ register select signal are supplied as inputs to an AND gate 154. A go sequence signal and a $V_j$ or $V_k$ register select signal are provided as inputs to AND gate 155. The outputs of AND gates 154 and 155 are applied as inputs to OR gate 142.

Figure 8:
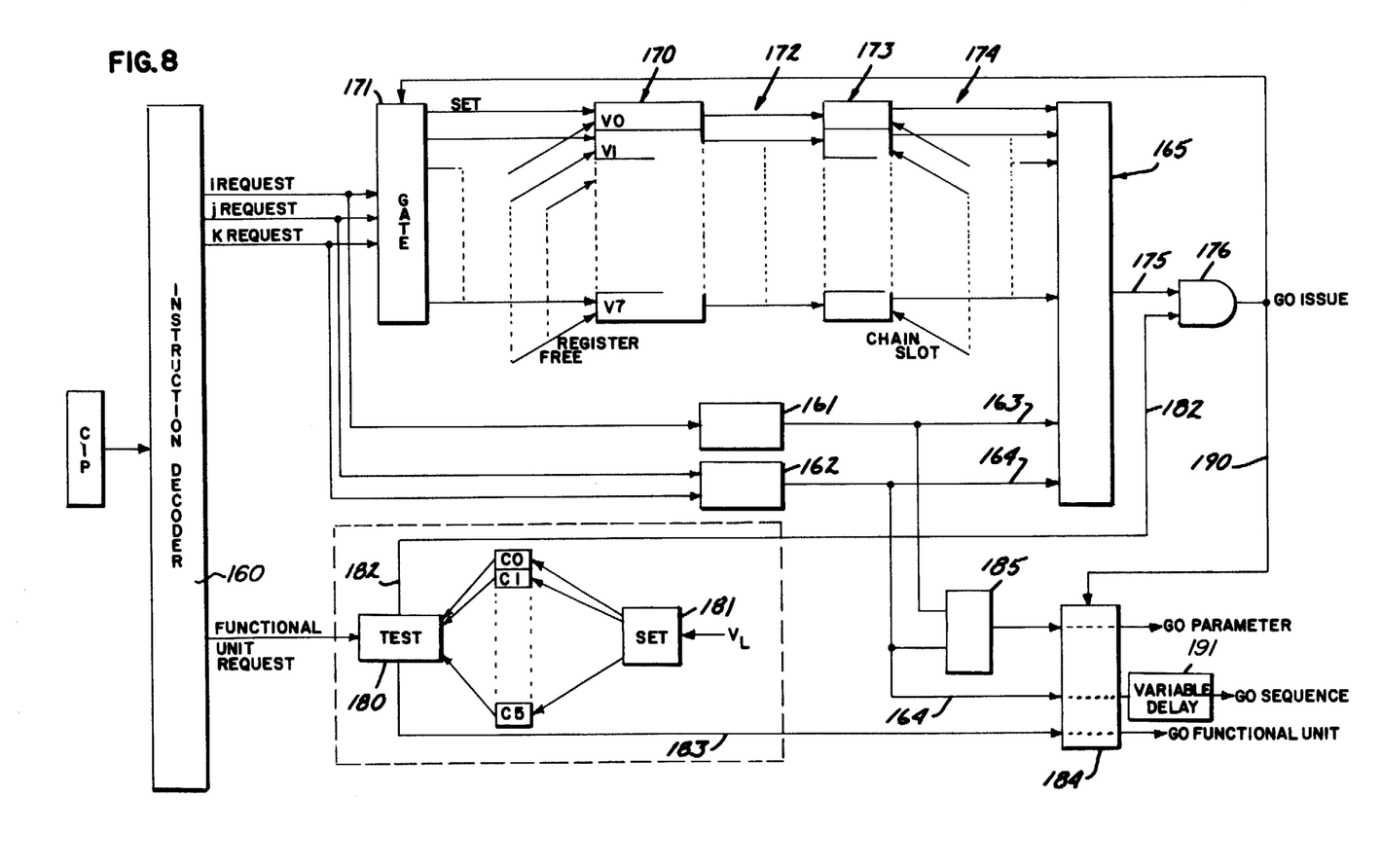
FIG. 8 is a schematic block diagram of the reservation and instruction issue portion of the vector register control.

Referring now to FIG. 8, the contents of the CIP register (current instruction parcel) are applied to a decoder 160. Before this instruction is allowed to issue, it is examined for possible timing conflicts with vector registers and functional units already involved in previous operations. This examination is performed as follows.

If the instruction is a vector instruction, the $i$, $j$ and k requests are decoded. The j and k requests indicate which of the eight vector registers are sought as operand registers, and the $i$ request indicates which of the vector registers is sought as the result register. The i request is transmitted to 161, then via lead 163 to a comparison circuit 165. The $j$ and $k$ requests are transmitted to 162, then via lead 164 to comparison circuit 165.

Reference number 170 generally designates the reservation register. It has eight sections, each corresponding to one of the vector registers V0 through V7. At a given moment, reservation register 170 contains set bits for each vector register currently involved in a vector process. These reservation bits were set via set lines from gate 171 by the issuance of a previous instruction. When a register becomes free upon completion of the vector process in which it was involved, a control signal is generated by the vector control circuits and is transmitted to the appropriate section of reservation register 170 as a register free signal. This removes the set bit in the reservation register.

The outputs indicating whether set or not for each of the sections of reservation register 170 are transmitted via leads 172 to a chain slot control 173. Chain slot control 173 has eight sections each corresponding to one of the vector registers V0 through V7. Ordinarily the signal applied thereto from lead 172 is transmitted through the chain slot control and leads 174 to compare circuit 165. During the chain slot time for a given vector register, a chain slot signal may be applied to the corresponding section of the chain slot control. Receipt of a chain slot signal momentarily blocks or removes any reservation signal which would otherwise be transmitted to compare circuit 165, but only for the single clock period of the chain slot signal.

Comparison circuit 165 functions to compare the i, j and k requests at leads 163 and 164 against the vector register reservation bits applied by leads 174. If no conflict exists, an enable is passed via lead 175 to AND gate 176. If a conflict exists, the enable is held until the conflict is resolved.

The functional units are also tested to see whether they are busy. This is accomplished by decoding a functional unit request signal from the decoder which is applied to a test circuit indicated by reference number 180. Associated with test circuit 180 are six counters C0 through C5, each of which is associated with a given functional unit. When a functional unit is involved in a vector process, the vector length information is applied to a set circuit 181 which sets the appropriate counter C0 through C5 involved in the process, according to the vector length. The counter then begins to count down on successive clock periods until it reaches zero, indicating that the functional unit is no longer reserved and is ready for another instruction.

Test unit 180 compares the functional unit request with the status of the functional unit counters. If the requested unit is available, an enable signal is passed on lead 182 to the other input of AND gate 176. If the requested counter is not available, the enable is held until the counter becomes available. At the same time as an enable signal is passed, the functional unit request is passed by lead 183 to a gate 184. Gate 184 also receives the j and k requests via control line 164. The i request information is combined with the j and k request information at 185, and the combined request information is passed via lead 186 to gate 184.

The output of gate 176 is called the go issue signal, and it is supplied via lead 190 to gate 184, and also to gate 171. The go issue enables the $i$, $j$ and $k$ request data to issue as a go parameter signal. At the same time, the functional unit request is issued as a go functional unit signal. The $j$ and $k$ data is passed through a variable delay 191 then issues as a go sequence signal.

The issue of instructions and flow of data will now be explained with reference to FIGS. 7 and 8 for an example. Assume that an instruction parcel has been loaded into CIP and is being decoded and checked for reservations on the requested vector registers and functional units. If the registers requested by the $i$, $j$ and $k$ designators do not have bits set in the reservation register, an enable is provided at 175. If the functional unit requested is not busy in a previous process, an enable is provided at lead 182. A go issue signal then issues on lead 190. The present $i$, $j$ and $k$ requests are then gated through gate 171 and into the sections of reservation register 170 corresponding to the registers to be used by the just issued instruction. At the same time gate 184 is enabled and the go parameter and go functional unit signals are passed. These signals are applied to the vector registers, path select networks and functional units involved in the just issued vector instruction, to provide setup. Delay 191 is provided to allow time for setup before the go sequence signal starts the vector process. Variable delay 191 is selected by a table or other means not shown according to the required setup time for the given functional unit and process involved.

Assume that vector register 120 of FIG. 8 has been selected as an operand register $V_k$ in the just issued instruction. Path select 122 is then set up to provide a data path from register 120 to the desired functional unit 124. Data path 126 or 127 may also be set up to provide date to the same functional unit from another vector register or a scalar register, depending upon the nature of the instruction. Alternatively, if the vector instruction is to write from the vector register into memory, path select network 122 will set up data path 125 to memory. The go functional unit signal sets up the selected functional unit for operation.

The go parameter signal also enables gate 145 so that the vector length number from the VL register is loaded into vector length counter 135. Since we are assuming that vector register 120 of FIG. 7 is to be an operand register, there will be no $V_i$ register select signal, so gate 154 will not be enabled. Instead, a $V_j$ or $V_k$ register select signal will be applied to gate 155 of this register, and all paths and units are now set up waiting for the go sequence signal.

Upon receipt of the go sequence signal, gate 155 is enabled, and this signal is transmitted through OR gate 142 as a start signal for gate 141 and an enable signal for the vector length counter.

Successive clock pulses now proceed to increment address counter 134, and with each increment a successive word element of vector register 120 is sent out over data path 121 to the functional unit. The functional unit then begins operating on the operands thus supplied together with the operands from the other source, data path 126 or 127.

At the same time, vector length counter 135 is enabled and successive clock pulses begin to decrement the vector length counter. If the count is not equal to zero, lead 146 remains enabled, and the address counter remains enabled. After a number of clock pulses equal to the vector length VL, the vector length counter reaches zero. At this point lead 146 removes the enable from gate 141 and address counter 134 so that no further elements will be clocked out of vector register 120. At the same time, a control signal is transmitted over line 147 as a register free signal. This signal is applied to the appropriate register free input to the reservation register 170, thus removing the reservation previously set on the particular vector register.

Assuming now that FIG. 7 represents the $V_i$ or result register in the previous example, vector control and processing proceeds as follows.

Upon issue, go parameter control will set up path select 130 to receive data from whichever functional unit is selected, and transmit data to the result vector register 120. If the instruction is one for transferring data from memory to the vector register, path 132 will be selected.

Vector length counter 135 will be loaded with the vector length as before, and address counter 134 is reset to zero ready to begin incrementing when enabled. Since the register is not selected as a $V_j$ or $V_k$ register, gate 155 is not enabled. Since the register is selected as a $V_i$ register, one enable is provided for gate 154. The other enable must come from the write control counter 136. Upon receipt of the go functional unit signal, count selector 151 loads a predetermined number into the write control counter. This predetermined number corresponds to the functional unit time for the functional unit involved.

Upon receipt of the go sequence signal, gate 150 is enabled, and successive clock pulses begin decrementing write control counter 136. However, address counter 134 and vector length counter 135 are not yet enabled for this $V_i$ register. Meanwhile, the operand registers are supplying elements to the functional unit, but results are not yet available at the output of the functional unit.

Two clock pulses before write control counter 136 reaches zero, a one period long pulse is transmitted over lead 152 as the chain slot signal. When the zero count is reached, an enable is provided on lead 153 to gate 154, gate 142, gate 141, the address counter and the vector length counter. On the next clock pulse, the address counter begins clocking the successive elements of vector register 120 to receive data which is now coming through signal path 131 and 133 from the functional unit. The delay provided by write control counter 136 thus correlates with the delay in receiving the first result from the functional unit. Thereafter, results are received on each successive clock period, and address counter 134 increments the elements of register 120 to receive the result vector. Vector length counter 135 operates in the manner previously described to halt the process when VL is reached, and to transmit a register free signal to the corresponding portion of the vector reservation register 170.

Assume that very shortly after issuance of the vector instruction in the previous example, a second vector instruction were to appear in CIP. Assume further that this instruction called for a different functional unit and result vector register, but that it called for the result register from the previous instruction to be an operand register in the subsequent instruction. An enable would be received at lead 182 in FIG. 8, since there would be no conflict with the functional units. However, the $j$ or $k$ requests would conflict with the result register from the process currently in progress as indicated by a set bit in the reservation register. No enable will then be provided at lead 175, and issue of the second instruction will be delayed. However, at two clock periods before the $i$ register of the previous instruction (intended to be an operand register for the subsequent instruction) begins to receive results, the chain slot signal is generated by the write control counter of the result register. This chain slot signal is applied to chain slot control 173 and removes, for one period only, the $i$ register reservation. During this clock period, the conflict detected by comparison circuit 165 is removed and the next control is immediately issued. Assuming two clock periods for setup time, the path select and functional unit select for the next vector instructions will be ready for the next vector instruction's go sequence signal, and the second vector process will be chained to the first. In other words, results received at the $i$ register for the first instruction will be simultaneously retransmitted as operands to the functional unit for the next instruction.

In a vector operation, the result register $V_i$ is not normally the same vector register as the source of either of the operands ($V_j$ or $V_k$), although the result register can become an operand register for a chained successive vector operation. However, turning the output stream of a vector functional unit back into the input stream by setting the $i$ designator to the same register designator as $j$ or $k$ may be desirable under certain circumstances since it provides a facility for reducing 64 elements down to just a few. The number of terms generated by the partial reduction is determined by the number of values that can be in process in a functional unit at one time (i.e., functional unit time plus two clock periods).

When the $i$ designator is the same as the $j$ or $k$ designator, a recursive characteristic is introduced into the vector processing because of the way in which element address counters (134) are handled. At the beginning of the operation for which $i$ is the same as $j$ or $k$, the address counters for both the operand register and the operand/result register are set to zero. The address counter for the operand/result register is held at zero and does not begin incrementing until the first result arrives from the functional unit at functional unit time plus two clock pulses. This counter then begins to advance by one each clock period. Note that until functional unit plus two clock periods, the initial contents of element zero of the operand/result register are repeatedly sent to the functional unit. The element counter for the other operand register, however, immediately begins advancing by one on each successive clock period thus sending the contents of elements zero, one, two. . . one successive clock periods, in accordance with the description previously set forth with respect to the operation of FIG. 7. Thus, the first functional unit time plus two elements of the operand/result register contain results based on the contents of element zero of the operand/result register and on successive elements of the other operand register. These functional unit time plus two elements then provide one of the operands used in calculating the results for the next functional unit time plus two elements. The third group of functional unit time plus two elements of the operand/result register contains results based on the results delivered to the second group of functional unit time plus two elements, and so on until the final group of functional unit plus two elements is generated as determined by the vector length.

As an example, consider the situation in which it is desired to sum all the elements of a single vector. Rather than performing successive addition operations on each element, the recursive characteristic of the vector functional unit can be employed for this vector summation. Assume that the initial conditions for the vector operation are the following: All elements of register V1 contain floating point values. Register V2 will provide one set of operands and will receive the results. ($i = j$) Element zero of this register contains a zero value. The vector length register VL contains 64.

A floating point add instruction is then executed using register V1 for one operand and using register V2 as an operand/result register. This instruction uses the floating point add unit which in the preferred embodiment has a functional unit time of 6 clock pulses causing sums to be generated in groups of eight (functional unit time plus 2 = 8). The final eight partial sums of the 64 elements of V1 will end up being contained in elements 56 through 63 of V2. Specifically, the elements of V2 will contain the sums indicated in FIG. 9, where subscripts indicate the individual elements of the specific registers, V1 or V2. The eight partial sums can then be summed in a separate process, with the entire summation having taken only a fraction of the time for scalar summation at 64 elements.

In the preferred embodiment of the present invention, if an integer summation were performed instead of a floating point summation, five partial sums would be generated and placed in elements 59 through 63 since the functional unit time for the interger add unit in the preferred embodiment is three clock pulses.

This recursive characteristic of vector processing is applicable to any vector operation, arithmetic or logical. The value initially placed in element zero of the operand/result register will depend on the operation being performed. For example, when using the floating point multiply unit, element zero of the operand/result register will usually be set to an initial value of 1.0.

In general, the vector processing means of the present invention may find wide use in many types of problems. One example may be with Do Loops in FORTRAN programs. Since these loops inherently involve repetitive operations on a set of data, they are readily adaptable to vector processing, and perhaps chaining. In addition, inner Do Loops nested within outer loops can be efficiently solved with a computer according to the present invention. Attempts have been made for many years to unwrap nested Do Loops by compiler action so as to speed efficiency in prior art machines, but the attempt has been largely unsuccessful. However, in the present invention, the inner loop may be run in vector mode while the loading and organizing for scalar mode running of each outer loop, and the memory to vector register loading for successive inner loop runs is taking place. Therefore, the startup time for the outer Do Loop in scalar mode is not wasted, but is hidden since it is concurrent with the running of an inner loop in vector mode.

If the number of elements in a loop or other vector exceeds 64, a vector loop is required to process the entire vector. The loop or vector is divided by 64 to determine the loop count. The loop is then processed in segments plus a remainder.

Another very useful example of a type of problem which can be efficiently solved by the present invention is matrix multiplication. When matrix A and matrix B are multiplied to give matrix C, the elements of matrix C are calculated by a summation of products of the row and column elements of matrix A and B. The calculation of this combination of multiplication and addition lends itself well to chaining, and as a result this type of problem can be performed with extreme efficiency according to the present invention.

Matrix multiplication is typical of the large class of problems which can be vectorized. For these problems a significant increase in processing speed can be achieved over conventional scalar processing. The use of register to register vector instructions, the concept of chaining, and the use of the plurality of independent segmented functional units provides a large amount of concurrency of processing. Further, since the startup time for vector operations are nominal, the benefits of vector processing are attainable even for short vectors. The resulting high processing speeds exceed those of other existing vector machines.

I claim:

1. Vector processing apparatus for a computer having a main memory, comprising:
   a plurality of vector registers each including means for holding a plurality of elements of an ordered set of data;
   at least one arithmetic or logical functional unit having an input for receiving operands and an output for delivering results, said functional unit including segmented means for holding data for operations not yet completed while receiving operands for successive operations;
   path select means associated with said vector registers and responsive to program instructions for selectively connecting individual vector registers for transmission of data to or from said main memory, and for selectively connecting individual vector registers for transmitting data as operands to a functional unit and for receiving results from a functional unit; and
   control means associated with said vector registers and responsive to program instructions, said control means being operative in conjunction with a vector register selected as an operand register in a vector processing operation to successively transmit the elements of the ordered set of data from the vector register to a functional unit on successive clock periods, said control means being operative in conjunction with a vector register selected as a result register in a vector processing operation to receive and store successive results transmitted from a functional unit as elements of an ordered set of data representing a result vector, on successive clock periods following delivery of the first result from the functional unit.

2. Vector processing apparatus according to claim 1 wherein said path select means and said control means are adapted for transmitting successive elements from a selected pair of any of said vector registers as operands to a functional unit and for transmitting results from the functional unit to a selected one of any of the other vector registers.

3. Vector processing apparatus according to claim 1 wherein said apparatus includes a plurality of independent segmented functional units and wherein said path select means and control means are operative in a chaining mode of operation to simultaneously transmit successive results received at one of said vector registers from a functional unit to another functional unit as successive operands therefor.

4. Vector processing apparatus according to claim 1 wherein said apparatus includes a plurality of independent segmented functional units and wherein said path select means and control means are adapted for transmitting successive elements from a first vector register as operands to a first functional unit and results from said first functional unit to a second vector register, and simultaneously transmitting successive elements from a third vector register as operands to a second functional unit and results from the second functional unit to a fourth vector register.

5. Vector processing apparatus according to claim 4 wherein said control means is operative in a chaining mode of operation so that results received from the first functional unit are simultaneously transmitted as operands to the second functional unit.

6. Vector processing apparatus according to claim 4 wherein said control means includes means for reserving a vector register involved in one vector process from involvement in another vector process and for removing the reservation upon completion of the first vector process.

7. Vector processing apparatus according to claim 6 further including means for temporarily removing the reservation of a vector register involved in receiving results in a vector operation at a time corresponding to reception of the first result element, so as to permit use of said register as an operand register in a chained vector operation.

8. The method of processing vectors in a computer having a main memory, a plurality of vector registers and at least one segmented arithmetic or logical functional unit for receiving successive inputs of operands while holding data for operations still being completed and for delivering successive operation results, comprising the steps of:

intermittently transmitting data from the main computer memory to vector registers for storage as a plurality of elements of an ordered set of data;

selecting from said plurality of vector registers at least one vector register to provide operands and one vector register to receive results;

successively transmitting the elements of the ordered set of data from the selected operand vector register to a functional unit on successive clock periods; and successively transmitting results produced by the functional unit as elements of an ordered set to the selected result vector register on successive clock periods following delivery of the first result from the functional unit.

9. The method according to claim 8 including the further step of simultaneously transmitting result elements received at the selected result vector register to another functional unit as operands for another vector process.

10. The method according to claim 9 including the further steps of reserving a vector register involved in one vector process from involvement in another vector process, and removing the reservation upon completion of the first vector process.

11. The method according to claim 10 including the further steps of temporarily removing the reservation of a vector register involved in receiving results in a vector process at a time corresponding to reception of the first result element, and simultaneously transmitting received result elements from the register as operands in a chained vector operation.

12. The method according to claim 8 including the further step of intermittently transmitting result vectors from vector registers to the main computer memory.

* * * * *